United States Patent Office 2,965,042
Patented Dec. 20, 1960

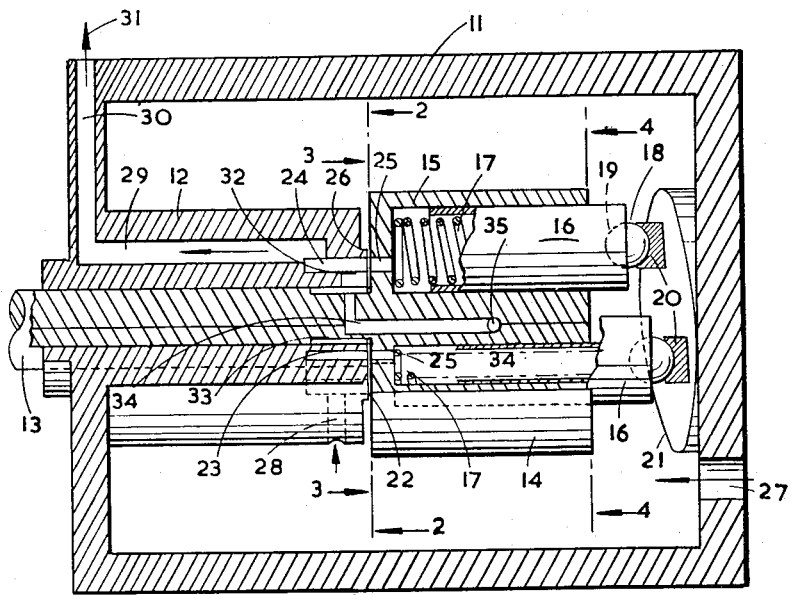
FIG. 1.
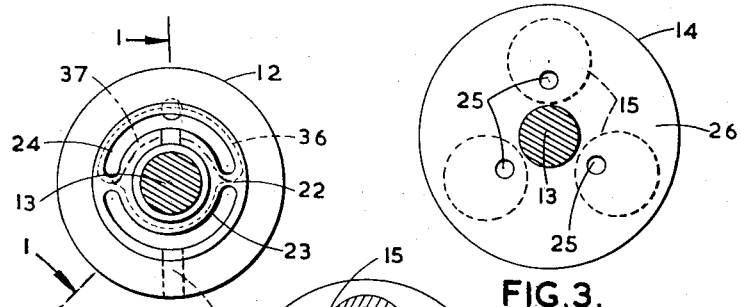
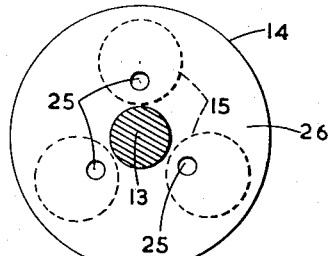
FIG. 2.
FIG. 3.
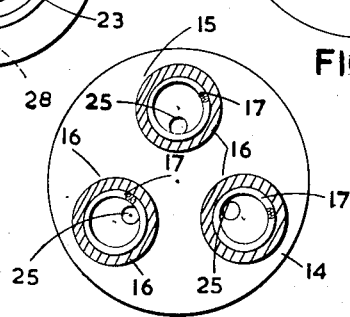
FIG. 4.

2,965,042

FUEL PUMP

Charles Spencer King and Robert N. Penny, Solihull, England, assignors to The Rover Company Limited, Solihull, England Filed Nov. 25, 1957, Ser. No. 698,842

Claims priority, application Great Britain Dec. 8, 1956

2 Claims. (Cl. 103—162)

This invention relates to a fuel pump of the kind in which a pump rotor is supported in a pump casing by a shaft coacting with a single bearing, the rotor including a plurality of spring-pressed pistons contained in axial bores of the rotor. The bores are so positioned that during rotation of the rotor an open end of each bore passes successively a fuel inlet and a fuel outlet, and the ends of the pistons remote from the open ends of the bores are acted upon for example, by a fixed, inclined, cam plate so arranged that during a single rotation of the rotor each piston sucks in fuel from the fuel supply inlet and at a later stage expels the fuel into the fuel outlet.

The fuel inlet and the fuel outlet are contained in a casing and are usually in the form of circumferentially-spaced, arcuate channels which are coaxial with the rotor and have the lateral sides, adjacent the rotor, open and contained in the plane of a stationary thrust face against which a coacting thrust face of the rotor is pressed by the pressure of fuel in the piston bores.

The pressure in each piston bore is greatest while the fuel is being expelled by the action of the cam plate, and because the fuel outlet, through which each piston bore expels its contained fuel in turn, is stationary, it follows that while the rotor will bear with greater pressure on the thrust face at that side of the rotor axis which is adjacent the fuel outlet channel than on the opposite side of that axis, there is also a greater tendency for the fuel to leak between the thrust faces and produce an opposing pressure tending to lift the rotor thrust face clear of the stationary thrust face. To combat this tendency it has been customary to vent the radially inner zone of the stationary thrust face to the inlet side of the pump so as to relieve the said opposing pressure.

This method of controlling the said opposing pressure is not available, however, when a pump of the kind set forth is provided with an additional outlet path which is in parallel with the main outlet and leads from the outlet channel and an axial bore of the rotor to, say, a centrifugally-operating valve, carried by the rotor, as in Specification No. 688,646 filed October 7, 1957. In such a case the venting of the radially inner zone of the stationary thrust face would preclude the possibility of the pump outlet pressure being available in the axial bore of the rotor, and the object of the present invention is an alternative way of preventing the pressure of the fuel tending to leak between the two thrust faces from urging them apart.

According to the invention a pump, of the kind set forth, has an annular channel provided between the rotor shaft and its bearing and has one axial side defined by the rotor thrust face or bearing surface, the annular channel being connected by radial channels or passages to the outlet channel or passage and axial bore or passage for supplying the latter with expelled fuel in parallel with the main fuel delivery, and the piston bores or cylindrical pumping chambers, the stationary thrust face and the springs being so proportioned in relation to the pressure of the fuel being expelled that the rotor will be biased towards the stationary thrust face at least mainly by the spring loading of the pistons alone.

Preferably, the annular channel is provided in the rotor shaft.

One embodiment of the invention is illustrated by the accompanying drawings, in which:

Figure 1 is a sectional view, taken on the line 1—1 of Figure 2, of a fuel pump for a gas turbine engine;

Figure 2 is a section of the line 2—2 of Figure 1 and showing the stationary thrust face;

Figure 3 is a section on the line 3—3 of Figure 1 and showing the rotor thrust face, and Figure 4 is a section on the line 4—4 of Figure 1.

Referring to the drawings, the pump comprises an outer casing 11 with an internal cylindrical boss 12 providing a single, long bearing for the shaft 13 of the rotor 14. The latter, in the example shown, has three equi-angularly-spaced bores or pumping chambers 15 containing respective thimble-like pistons 16 which are biased outwardly by internal springs 17. A ball 18 is retained in a part-spherical recess 19 in the outer end of each piston and engages in a cup-like recess of a slipper 20 which is held, by the associated spring 17, in coactive engagement with a cam plate 21 fast within the adjacent end of the casing 11.

The inner axial end of the boss 12 is formed with a thrust face 22 in which are formed, on opposite sides of a diameter, an arcuate inlet channel or passage 23 and a coaxial, arcuate outlet channel or passage 24; while the inner end of each piston bore or cylindrical pumping chamber is formed with a duct 25 which extends through a thrust face or balancing surface 26 of the rotor and is at a radius to enable it to communicate with one or other of these channels or passages according to the rotational position of the rotor relatively to the boss. In Figure 1 the thrust faces 22 and 26 are shown spaced apart for ease of illustration, but they are obviously intended to be in abutting contact.

Liquid fuel is fed to the interior of the casing 11 through a supply opening 27, and as each duct 25 moves into registration with the nearer end of the inlet channel 23, and the associated spring 17 causes the associated slipper to ride down the cam 21, the coacting piston bore inspires from the interior of the casing 11 a charge of the fuel through the said duct, and through a radial duct 28 which is in the boss 12 and communicates with the inlet channel 23. Continued rotation of the rotor brings the duct 25 of the piston bore in question next into registration with the outlet channel 24 whence it is expelled, by the action of the slipper riding up the cam, through communicating passages 29, 30, in the boss and casing respectively, to a delivery point as indicated by the arrow 31.

As thus far described the pump is of known construction, and it will not only be seen that the pressure acting on the fuel in the piston bore during the expulsion stroke urges the rotor thrust or balancing face 26 on to the stationary thrust face 22 at one side of the axis of the shaft 13, but that any leakage of expelled fuel between the thrust faces 22 and 26 will tend to force them out of engagement. For combating that it has been customary to vent the radially inner zone of the thrust face 22 to the inlet side of the pump, as previously mentioned.

In accordance with the invention, however, the outlet channel is provided with a radial channel or passage 32 which communicates with an annular channel or passage 33 formed in the shaft and having one axial end wall defined by the rotor thrust face or balancing surface 26. This annular channel communicates through an axial bore 34, in the shaft 13, leading to a transverse bore 35 for supplying the outlet pressure to whatever may be mounted on the rotor (e.g., a centrifugally-operating valve). It will be seen that the expulsion pressure of the fuel (i.e., of the fuel present in the outlet channel 24 and the fuel which leaks between the thrust face) is applied to the rotor thrust face or balancing surface in opposition to the expulsion pressure within the piston bore or pumping chamber which is expelling the fuel, and by correctly proportioning the thrust face 22, the piston bores or pumping chambers and the strengths of the springs 17 it can be arranged for the pressure urging the thrust faces into engagement to be at least mainly due to the effort of the said springs.

The zone in which the pressure of the fuel leaking between the thrust faces acts on the rotor is indicated by the dotted line 36, and it will be appreciated that if the radially inner portion of the thrust face 22 had been vented (e. g., through a duct in the shaft) to the inlet side of the pump, the lower limit of this pressure zone would have been between the outlet channel 24 and the shaft 13 as indicated by the chain line 37.

What we claim as our invention and desire to secure by Letters Patent of the United States is:

1. A fuel pump comprising a casing, a rotor mounted on a shaft coacting with a bearing in said casing provided with a stationary thrust face, the rotor including a plurality of cylindrical pumping chambers and pistons in said chambers, said rotor having a balancing surface on an end thereof and passages through said balancing surface, cam means fast with said casing, spring means in said cylindrical pumping chambers reactive between the pistons and rotor to bias the rotor into contact with said stationary thrust surface and to move said pistons into contact with the surface of said cam means to move said pistons inwardly of said cylindrical pumping chambers against said spring means in succession as said rotor rotates, a fuel inlet and a fuel outlet in said stationary thrust face communicating with each of said cylindrical pumping chambers adapted to register in succession through a single rotation of said rotor so that each piston first sucks in fuel from said inlet and at a later stage expels it into said outlet, an annular channel between said shaft and its bearing, one axial side of said channel being defined by said balancing surface of the rotor, a lateral passage connecting said annular channel to said fuel outlet and another passage leading from said outlet to an axial bore which is in said shaft arranged to receive expelled fuel in parallel with a main fuel delivery leading from said outlet, and said cylindrical pumping chamber and said annular channel being so proportioned as to equal the force created by said pumping pistons, thereby allowing said spring means to bias the said rotor against said stationary thrust face.

2. A fuel pump according to claim 1 wherein said fuel inlet and said fuel outlet are coaxial and circumferentially spaced.

References Cited in the file of this patent
UNITED STATES PATENTS

| | | |
|---|---|---|
| 1,521,884 | Higgins | Jan. 6, 1925 |
| 2,543,624 | Gabriel | Feb. 27, 1951 |
| 2,674,191 | Ifield | Apr. 6, 1954 |
| 2,770,099 | Badalini | Nov. 13, 1956 |
| 2,847,938 | Gondeh | Aug. 19, 1958 |

FOREIGN PATENTS

| | | |
|---|---|---|
| 752,021 | Great Britain | July 4, 1956 |